United States Patent [19]
Sattich et al.

[11] Patent Number: 5,256,742
[45] Date of Patent: Oct. 26, 1993

[54] PREPARATION OF POLY(ARYLENE SULFIDE)S FROM POLY(ARYLENE SULFIDE DISULFIDE)

[75] Inventors: William E. Sattich, Bartlesville, Okla.; Owen H. Decker, West Reading, Pa.; Dwayne R. Senn; Darryl R. Fahey, both of Bartlesville, Okla.

[73] Assignee: Phillips Petroleum Company, Bartlesville, Okla.

[21] Appl. No.: 957,854

[22] Filed: Oct. 8, 1992

[51] Int. Cl.$^5$ .............................. C08G 75/16
[52] U.S. Cl. .................... 525/537; 525/491; 528/388
[58] Field of Search ............. 525/537, 491; 528/388

[56] References Cited

U.S. PATENT DOCUMENTS

| | | | |
|---|---|---|---|
| 4,786,713 | 11/1988 | Rule et al. | 528/389 |
| 4,792,600 | 12/1988 | Rule et al. | 528/389 |
| 4,826,956 | 5/1989 | Fagerburg et al. | 528/214 |
| 4,855,393 | 8/1989 | Rule et al. | 528/212 |
| 4,857,629 | 8/1989 | Rule et al. | 528/217 |
| 4,859,762 | 8/1989 | Rule et al. | 528/215 |
| 4,877,851 | 10/1989 | Fagerburg et al. | 525/537 |
| 4,877,862 | 10/1989 | Fagerburg et al. | 528/481 |
| 4,897,454 | 1/1990 | Fagerburg et al. | 528/537 |
| 4,939,236 | 7/1990 | Fagerburg et al. | 528/389 |
| 4,952,671 | 8/1990 | Fagerburg et al. | 528/226 |
| 4,977,224 | 12/1990 | Watkins et al. | 525/471 |
| 4,977,236 | 12/1990 | Fagerburg et al. | 528/226 |
| 4,997,894 | 3/1991 | Teegarden | 525/537 |

*Primary Examiner*—Harold D. Anderson
*Attorney, Agent, or Firm*—Lucas K. Shay

[57] ABSTRACT

A process for preparing a poly(arylene sulfide) and copolymer thereof from a poly(arylene sulfide disulfide) is provided which comprises contacting the poly(arylene sulfide disulfide) with a polyhalo-substituted cyclic compound having unsaturation between adjacent ring carbon atoms and having halogen atoms attached to the ring carbon atoms in a polar organic compound and a basic compound at an elevated temperature. Alternatively, the poly(arylene sulfide disulfide) can be substantially dissolved in the polar organic solvent at elevated temperature to form fragments which can be contacted with the polyhalo-substituted cyclic compound in a polar organic compound and a basic compound at an elevated temperature. The fragments also can be isolated, recovered and then contacted with the polyhalo-substituted cyclic compound in a polar organic compound and a basic compound at an elevated temperature.

31 Claims, No Drawings

PREPARATION OF POLY(ARYLENE SULFIDE)S FROM POLY(ARYLENE SULFIDE DISULFIDE)

FIELD OF THE INVENTION

This invention relates to conversion of poly(arylene sulfide disulfide) to poly(arylene sulfide)s and copolymers thereof.

BACKGROUND OF THE INVENTION

Poly(arylene sulfide) resins are polymers having good thermal stability, chemical resistance, flame resistance, and electrical insulation properties. They can be used as coating for pipes, tanks or pumps and in electronic or electrical application.

Poly(phenylene sulfide), a commercially available poly(arylene sulfide) polymer marketed by Phillips Petroleum Company, Bartlesville, Okla., can be prepared by reacting a polyhalo-substituted cyclic compound such as 1,4-dichlorobenzene in a polar organic compound such as N-methyl-2-pyrrolidone with a sulfur source such as sodium sulfide. The process optionally can include molecular weight modifying agents, for example, an alkali metal carboxylate, in the reaction mixture to increase the molecular weight of the resin, or be in the presence of varying amount of water. The process generally produces an alkali metal halide such as sodium chloride as a by-product.

U.S. Pat. No. 4,786,713 discloses that a poly(arylene sulfide disulfide) can be prepared by reaction of p-diiodobenzene and elemental sulfur in a neat melt to generate the poly(arylene sulfide disulfide) and elemental iodine as a by-product. An "oxyiodination" process can be used to convert the iodine into p-diiodobenzene by reacting the iodine with benzene and oxygen with generation of water as by-product. See U.S. Pat. No. 4,746,758. Thus the iodine by-product from the poly(arylene sulfide disulfide) synthesis can be recovered and recycled to produce more p-diiodobenzene. Overall, these combined processes convert benzene, sulfur, and oxygen to poly(arylene sulfide disulfide) with water being the sole by-product.

However, the poly(arylene sulfide disulfide) polymer does not have the properties described above for a poly(arylene sulfide). For example, the poly(arylene sulfide disulfide) resin lacks chemical resistance.

It is highly desirable to develop a process to convert the poly(arylene sulfide disulfide) into a poly(arylene sulfide) resin having the properties and utilities described above. Such a process would be a significant contribution to the art because less expensive feedstocks, less salt by-product, and reduction of waste are involved in such a process as compared to the above mentioned process for producing a poly(arylene sulfide).

SUMMARY OF THE INVENTION

An object of the present invention therefore is to provide a process for converting a poly(arylene sulfide disulfide) resin to a poly(arylene sulfide) resin and a copolymer thereof. Another object of the present invention is to provide a process for synthesizing a poly(arylene sulfide) polymer from inexpensive feedstocks. A further object of the present invention is to provide a process for synthesizing a poly(arylene sulfide) polymer which reduces environmentally harmful by-products.

Other objects, advantages and features will become more apparent as the invention is more fully described.

According to the present invention, a process for producing a poly(arylene sulfide) and a copolymer thereof from a poly(arylene sulfide disulfide) comprises contacting a poly(arylene sulfide disulfide) with a polyhalo-substituted cyclic compound, containing unsaturation between adjacent ring carbon atoms and having halogen atoms attached to ring carbon atoms, in a polar organic compound and a basic compound at an elevated temperature.

According to another embodiment of the invention, a process for producing a poly(arylene sulfide) and a copolymer thereof from a poly(arylene sulfide disulfide) is provided which comprises: (1) substantially solubilizing a poly(arylene sulfide disulfide) in a polar organic compound at an elevated temperature to form fragments of the poly(arylene sulfide disulfide); (2) optionally isolating the fragments; and (3) contacting the fragments with a polyhalo-substituted cyclic compound, which contains unsaturation between adjacent ring carbon atoms and has halogen atoms attached to ring carbon atoms, in a polar organic compound and a basic compound at an elevated temperature.

DETAILED DESCRIPTION OF THE INVENTION

The poly(arylene sulfide disulfide) which is to be converted to a poly(arylene sulfide) and a copolymer thereof can be prepared by any known methods such as those disclosed in the U.S. Pat. Nos.: 4,977,236; 4,952,671; 4,939,236; 4,897,454;, 4,877,862; 4,877,851; 4,859,762, 4,857,629; 4,855,393; 4,826,956; 4,792,600; 4,786,713; all are incorporated herein by reference.

The polyhalo-substituted compounds which can be employed as primary reactants in the process of the invention are represented by the formulas:

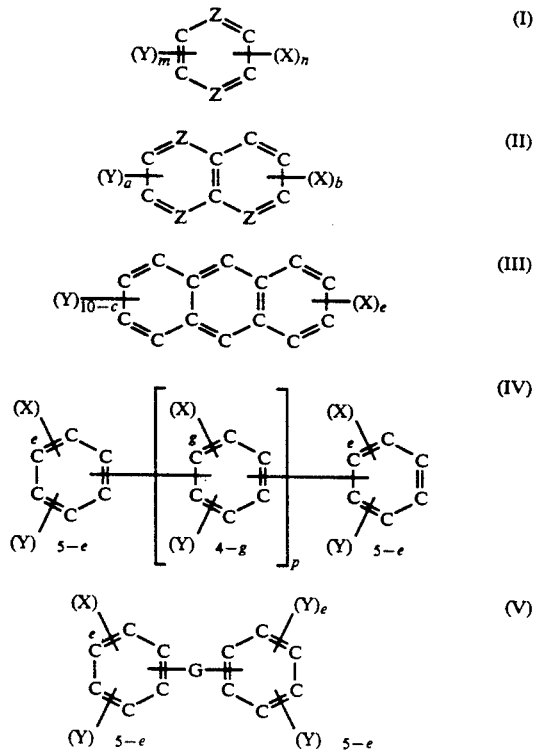

-continued
and

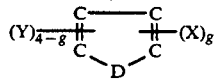

where each X is a halogen selected from the group consisting of chlorine, bromine, iodine and fluorine, preferably chlorine and bromine; each Y is selected from the group consisting of hydrogen, alkyl groups, $-N(R)_2$, $-C(O)OR$, $-C(O)OM$, $-C(O)N(R)_2$, $-N(R)C(O)R'$, $-OR'$, $-SR'$, $-SO_3H$, and $-SO_3M$; each R is selected from the group consisting of hydrogen and alkyl, cycloalkyl, aryl, aralkyl, and alkaryl radicals containing from 1 to 12 carbon atoms; each R' is selected from the group consisting of alkyl, cycloalkyl, aryl, aralkyl and alkaryl radicals containing from 1 to 12 carbon atoms; M is an alkali metal selected from the group consisting of sodium, potassium, lithium, rubidium, and cesium; each Z is selected from the group consisting of $-N=$ and $-C=$; D is selected from the group consisting of $-O-$, $-S-$, and $-N(R)-$; G is selected from the group consisting of $-O-$, $-N(R)-$, $-C(R)(R)-$, $-Si(R')(R')-$, $-P(O)(R)-$, $-SO_2-Ar-ArSO_2-$, $+SO_2-Ar-S-Ar-SO_2+$, $-C(O)-$, $-S(O_2)-$, and a block of a polymer; where Ar is a cyclic compound containing unsaturation between adjacent ring carbon atoms; q is an integer from about 1 to about 100, preferably about 1 to about 50, and most preferably 1 to 20; the block of a polymer has a number of repeating units from about 10 to about 500, preferably from about 10 to about 200, and most preferably from 10 to 100; n is an integer from 2 to 6; when both Z's in Formula I are $-C=$, $m=6-n$, when one Z in Formula I is $-C=$, $m=5-n$, when both Z's in formula I are $-N=$, $m=4-n$; b is an integer from 2 to 8; when Z in Formula II is $-C=$, $a=8-b$; when Z in Formula II is $-N=$, $a=7-b$; c is an integer from 2 to 10; g is an integer of 2 to 4; e is an integer from 1 to 5; and p is an integer selected from the group consisting of 0 and 1.

The compounds of the above general formulas which are preferred are those which contain not more than three halogen atoms, and more preferably are dihalo-substituted compounds.

Some specific examples of polyhalo-substituted compound of the above general formulas which can be employed in the process of this invention include, but are not limited to, 1,2-dichlorobenzene, 1,3-dichlorobenzene, 1,4-dichlorobenzene, 2,5-dichlorotoluene, 1,4-dibromobenzene, 1,4-diiodobenzene, 1,4-difluorobenzene, 2,5-dibromoaniline, N,N-dimethyl-2,5-dibromoaniline, 1,3,5-trichlorobenzene, 1,2,4,5-tetrabromobenzene, hexachlorobenzene, 1-n-butyl-2,5-dichlorobenzene, 1-cyclohexyl-2,5-diiodobenzene, 1-isooctyl-2,4-difluorobenzene, 1-n-dodecyl-2,5-dichlorobenzene, 1-benzyl,2,5-dibromobenzene, 1,4-di-n-butyl-2,5-dichlorobenzene, 1,4-di-n-nonyl-2,6-di-bromobenzene, 4,4'-bis(p-chlorophenylsulfonyl)biphenyl, 1,3,5-trichloro-2,4,6-triphenylbenzene, 1,4-dibromo-2,3,5,6-tetra(4-ethylphenyl)benzene, methyl 2,5-dichlorobenzoate, isopropyl 2,3,5-tribromobenzoate, cyclohexyl 2,4,6-triiodobenzoate, phenyl 2,3,4,5,6-pentachlorobenzoate, 2,5-dichlorobenzamide, N,N,di-n-dodecyl-2,4,5-tribromobenzamide, ethyl 2,4,5-trichloroacetanilide, cyclohexyl N-methyl-2,5-dibromoacetanilide, 1,4-dibromonaphthalene, 1,4-dichloro-7,8-diethylnaphthalene, 1-methoxy-2,5-dichlorobenzene, 1-cyclohexylthio-2,5-dichlorobenzene, 1,4,7,8-tetrabromo-2,3,5,6-tetra-n-butylnaphthalene, 1,3,5-trichloro-7-aminonaphthalene, n-octyl 2,4-dibromo-naphthalene-1-carboxylate, N,N-dimethyl-5,6,7,8-tetrabromo-1-naphthalenecarboxamide, 1-acetamido-2,4-dibromonaphthalene, 8-decoxy-1,4-difluoronaphthalene, 6,7-dibenzyl-8-methylthio-1,4-dichloronaphthalene, 1,4-dichloroanthracene, 1,7-dibromo-6-cyclohexylanthracene, 2,8-diiodo-3,7-diethylanthracene, 1-dodecyl-2,6-difluoroanthracene, 1,2,4-trichloro-6-carbethoxyanthracene, 2,6-dibromo-8-aminoanthracene, 3,7-diiodo-4-cyclohexylthioanthracene, n-decyl 3,8-difluoroanthracene carboxylate, 1-acetamido-2,4-dibromoanthracene, 10-dodecoxy-1,3,5-trichloroanthracene, 4,4'-dichlorobiphenyl, 3,4'-dibromo-2-aminobiphenyl, 2,2',4-tribromo-6-acetamidobiphenyl, 3,3'-dichloro-4,4'-didodecylbiphenyl, 4,4'-dichlorophenyl sulfone, 4,4'-diiodo-3-ethoxy-6-n-octylbiphenyl, 4,4'-dichlorophenyl ketone 2,2',4,4'-tetrabromo-6-N,N-dimethylaminobiphenyl, 4,4'-dichloro-3,3'-dicyclohexylbiphenyl, 4,4'',dibromo-p-terphenyl, 3,3',3''-trichloro-p-terphenyl, 4,4''-dichloro-3'-acetamido-p-terphenyl, 4,4''-difluoro-2,2',2''-tri-n-decyl-3'-methoxy-p-terphenyl, 4,4''-dibromo-3'-butoxy-p-terphenyl, 4,4''-dichloro-2-(N-acetylamino)-p-terphenyl, 3,4-dibromothiophene, 3,4-dichlorofuran, 3,4-difluoropyrrole, 2,4-dibromo-4-aminothiophene, 2,5-dichloro-3-ethoxythiophene, 3,4-difluoro-5-acetamidofuran, 3,4-dibromo-5-carbethoxypyrrole, 2,4-dichloropyridine, 3,5-dibromo-4-methylpyridine, 4,8-diiodoquinoline, 2,3,6,7-tetrachloro-4,5-di-n-butylquinoline, 1,4-dibromo-2,3-5,6-tetrafluorobenzene, 4-chlorobromobenzene, 2,5-dichlorobenzenesulfonic acid, sodium 2,5-dibromobenzenesulfonate, 2,8-difluoronaphthalenecarboxylic acid, lithium 2,7-diiodoanthracenecarboxylate, p,p-dichlorodiphenyl ether, o,p'-dibromodiphenylamine, 2,4'-difluorodiphenylmethane, 3,3'-dichlorodiphenyl dimethylsilane, methyl di(3-ethyl-4-chlorophenyl) phosphite, 4-bromophenyl 3-n-butyl-4-chlorophenyl sulfone, and 2,6-dichloropyrazine.

Generally the polar organic compound will substantially dissolve both the poly(arylene sulfide disulfide) and the polyhalo-substituted aromatic compound under the reaction conditions. Representative examples of suitable classes of compounds include, but are not limited to, amides, lactams, sulfones, and mixtures thereof. Specific examples of such compounds include, but are not limited to, hexamethylphosphoramide, tetramethylurea, N,N'-ethylene dipyrrolidone, N-methyl-2-pyrrolidone(NMP), pyrrolidone, caprolactam, N-ethylcaprolactam, sulfolane, dimethylacetamide, diphenyl sulfone, low molecular weight polyamides and mixtures thereof.

The basic compound used in the invention can be an organic base or an inorganic base and can be in either aqueous or non-aqueous form. The presently preferred is an inorganic base having a formula of MOH where M is as defined above and includes potassium hydroxide and sodium hydroxide. The presently most preferred basic compound is sodium hyroxide because of its availability and ease of use.

The process of the present invention can also be carried out by contacting an alkali metal carboxylate with the reactants described above. The process can also be carried out in the presence of water. The alkali metal carboxylate has the formula of $R''CO_2M$ where M is as defined above and R" is a hydrocarbyl radical selected from the group consisting of alkyl, cycloalkyl, aryl and mixtures of any two or more thereof. Preferably R" is an alkyl radical having 1 to about 6 carbon atoms or a phenyl radical and M is lithium or sodium, most preferably lithium. If desired, the alkali metal carboxylate can be employed as a hydrate or as a solution or dispersion in water.

Examples of alkali metal carboxylates which can be employed in the process of this invention include, but are not limited to, lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate rubidium 4-ethyltetradecanoate, sodium octadecanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and mixtures thereof.

The process of the present invention can also be carried out by further contacting an organic amide with the reactants described above. The organic amides used in the method of this invention should be substantially liquid at reaction temperatures and pressures employed. The amides can be cyclic or acyclic and can have from 1 to about 10 carbon atoms per molecule. Examples of some suitable amides include, but are not limited to, formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, N-ethyl-caprolactam, N-methyl-3-caprolactam, N,N'-ethylenedi-2-pyrrolidone, hexamethylphosphoramide, tetramethylurea, and mixtures thereof.

The process of this invention can be carried out by contacting the poly(arylene sulfide disulfide) with a polyhalo-substituted cyclic compound in a polar organic compound and a basic compound at a temperature in the range of from about 125° C. to about 450° C., preferably from about 150° C. to about 350° C., and most preferably from 180° C. to 300° C.; under a pressure from about 0.1 atmosphere to about 25 atmospheres, preferably from about 0.5 atmosphere to about 15 atmospheres, and most preferably from 0.9 atmosphere to 10 atmosphere; and for a period of time in the range of from about 20 minutes to about 20 hours, preferably from about 30 minutes to about 10 hours, and most preferably from 1 hour to 5 hours.

The weight ratio of the polyhalo-substituted cyclic compound to poly(arylene sulfide disulfide) is dependent upon the structures of the polyhalo-substituted cyclic compound and the poly(arylene sulfide disulfide), and is in the range of from about 0.001:1 to about 500:1, preferably from about 0.01:1 to about 50:1, and most preferably from 0.1:1 to 20:1. The weight ratio of the polar organic compound to poly(arylene sulfide disulfide) is in the range of from about 1:1 to about 200:1, preferably from about 2:1 to about 100:1, and most preferably from 3:1 to 50:1. The weight ratio of the basic compound to poly(arylene sulfide disulfide) is in the range of from about 0.01:1 to about 5:1, preferably from about 0.05:1 to about 1:1, and most preferably from 0.2:1 to 0.5:1. The weight ratio of the alkali metal carboxylate, if present, to poly(arylene sulfide disulfide) is in the range of from about 0.01:1 to about 20:1, preferably from about 0.1:1 to about 10:1, and most preferably from 0.2:1 to 1:1. The weight ratio of the organic amide, if present, to poly(arylene sulfide disulfide) is in the same range as the weight ratio of alkali metal carboxylate to poly(arylene sulfide disulfide). The weight ratio of water, if present, to poly(arylene sulfide disulfide is in the range of from about 0.001:1 to about 2:1, preferably from about 0.005:1 to about 1:1, and most preferably from 0.1:1 to 0.5:1.

In the second embodiment of the invention, the poly(arylene sulfide disulfide) is first substantially solubilized in a polar organic compound at an elevated temperature in a range of from about 60° C. to about 300° C. to form fragments of the poly(arylene sulfide disulfide). The term "fragments" used herein refers to, unless otherwise described, repeating units of monomers. The number of repeating units can range from about 3 to about 100. The term "monomers" are molecules that form the repeating units of the fragments. The scope and quantity of the polar organic compound are the same as those disclosed in the previous embodiment of the invention. However, the temperature is preferably less than about 250° C. and holding time at the elevated temperature should be relatively short depending on the temperature. Generally it is less than 10 minutes, preferably less than 5 minutes. Recovery of the fragments can be carried out after the temperature is cooled, generally at a temperature in the range of from about 10° C. to about 50° C., to precipitate the fragments followed by any suitable separation means such as, for example, filtration, centrifugation, decantation, and drying.

The fragments recovered are then contacted with a polyhalo-substituted cyclic compound under the same conditions disclosed in the first embodiment of the invention. The weight ratios of polyhalo-substituted cyclic compounds, polar organic compound, basic compound, alkali metal carboxylate (if present), and water (if present) to the fragments are the same as the weight ratios of these chemicals to the poly(arylene sulfide disulfide) disclosed in the first embodiment of the invention. The scope of these chemicals is also the same as that disclosed in the first embodiment of the invention.

Polymers produced by the process of this invention can vary depending upon the chosen reactants. Some can be high melting high molecular weight thermoplastic materials having excellent high temperature stability, while others can be much lower in molecular weight, including liquids and grease-like materials. The melting, or softening, point of these polymers can range from liquids at 25° C. to polymers melting above 400° C. These polymers can be heat-treated in the absence of oxygen or with an oxidizing agent at any pressure to increase the molecular weight by either a lengthening of a molecular chain, crosslinking, or a combination of both to improve such properties as tensile strength. Such treatment can be effected, for example, by heating the polymer preferably to a temperature above its melting point, in some cases as high as 250° C.

The polymers produced by the process of this invention can be molded into a variety of useful articles by molding techniques which are well known in the art. The polymers can be molded directly after recovery from the reaction zone in which they are prepared, or such polymers can be subjected to a heat treatment as described above prior to molding.

The polymers of this invention have utility in any use wherein high melting point and/or high temperature stability is desired. These polymers can be blended with fillers, pigments, stabilizers, softeners, extenders and other polymers. Such fillers as graphite, carbon black, titania, glass fibers, metal powders, magnesia, asbestos, clays, wood flour, cotton floc, alpha cellulose, and mica can be employed. If desired, such fillers can be added to the reactor. These filled polymers can be particularly useful in high temperature applications.

EXAMPLES

The following non-limiting examples are provided to illustrate that poly(arylene sulfide disulfide) can be converted into other poly(arylene sulfide)s or copolymers thereof by the process of the present invention. The poly(arylene sulfide disulfide) used in these examples was poly(phenylene sulfide disulfide) (hereinafter referred to as PPSDS), which was prepared under conditions such as those described in U.S. Pat. No. 4,786,713.

EXAMPLE I

This example illustrates that PPSDS is degraded in a polar organic compound, N-methyl-2-pyrrolidone (NMP) at high temperature.

To a closed 1 liter stainless steel autoclave under nitrogen atmosphere, 100 g of solid PPSDS, 315 g of NMP and 20 g of water were added. The mixture was heated, with stirring, under nitrogen atmosphere, at 200° C. for one hour and then further heated at 265° C. for three hours to form a solution. The solution was then allowed to cool to ambient temperature. The solution remained and no solid could be recovered.

The result suggests that PPSDS, in contrast to poly(phenylene sulfide) (hereinafter referred to as PPS), is not resistant to chemicals. Wishing not to be bound by theory, the degradation of PPSDS is believed to be the result of the relative instability of the disulfide linkages of the PPSDS as compared to the sulfide linkage of PPS.

EXAMPLE II

This example illustrates the formation of recoverable poly(phenylene sulfide) polymer by the inventive process.

PPSDS (66 g), p-dichlorobenzene (50 g), sodium hydroxide (26 g), N-methyl-2-pyrrolidone (315 g) and water (5 g) were added to a closed autoclave under nitrogen atmosphere to form a mixture. The mixture was then heated, under nitrogen atmosphere, with stirring at 200° C. for one hour followed by heating at 265° C. for 3 hours. The autoclave and its contents were allowed to cool to ambient temperature (25° C.). Thereafter, the product polymer was recovered on a 170 mesh screen, washed three times with 300 ml hot water (about 100° C.) and then once with 300 ml acetone followed by drying under vacuum (0.2 atmosphere) at 100° C. for 16 hours. A yield of 76.6 g of an off-white powder was obtained.

EXAMPLE III

This example further illustrates that recoverable poly(phenylene sulfide) polymers and copolymers can be made from PPSDS by the process of the invention.

The runs were carried out as that described in Example II except that the reactants, quantities of the reactants, and heating time were different, as shown in Table I.

TABLE I

Conversion of PPSDS to Other Poly(arylene Sulfide)s

| Run | Dihaloaromatic Compound[a] | PPSDS g | NaOH g | NaOAc g | NMP[b] g | Water g | Time hours | Temp. °C. | Yield g |
|---|---|---|---|---|---|---|---|---|---|
| 1 | Cl—Ph—Cl | 12.0 | 25.0 | 6.5 | 8.2 | 100 | 2.5 | 1.0 | 200 | |
| | | | | | | | | 3.0 | 265 | 25.2 |
| 2 | Cl—Ph—Cl | 11.0 | 25.5 | 7.0 | 0.0 | 100 | 0.5 | 1.0 | 200 | |
| | | | | | | | | 3.0 | 235 | 25.9 |
| 3 | Cl—Ph—SO$_2$—Ph—Cl | 17.6 | 19.2 | 5.4 | 12.3 | 120 | 0.5 | 3.0 | 200 | 16.0 |
| 4 | Cl—Ph—CO—Ph—Cl | 15.4 | 19.2 | 5.4 | 12.3 | 120 | 0.5 | 3.0 | 200 | 5.5 |
| 5 | Cl—Ph—SO$_2$—Ph—Ph—SO$_2$—Ph—Cl | 30.8 | 19.2 | 5.4 | 12.3 | 120 | 0.5 | 3.0 | 200 | 5.5 |
| 6 | Cl—[—Ar—SO$_2$—Ar—S—]$_n$—Ar—SO$_2$—Ar—Cl n~13 | 17.1 | 1.6 | 0.5 | 6.1 | 60 | 0.2 | 3.0 | 200 | 17.4 |
| 7 | Cl—Ph—Cl | 11.0 | 25.5 | 0.0 | 7.5 | 100 | 2.5 | 1.0 | 200 | |
| | | | | | | | | 3.0 | 265 | NR[c] |
| 8 | Cl—Ph—SO$_2$—Ph—Cl | 17.6 | 0.0 | 5.4 | 12.3 | 120 | 0.1 | 1.0 | 200 | NR |
| 9 | Cl—Ph—Cl | 10.0 | 25.5 | 7.0 | 0.0 | 100 | 0.5 | 1.0 | 200 | |
| | | | | | | | | 3.0 | 235 | NR |

[a]Ph = p-C$_6$H$_4$
[b]N-methyl-2-pyrrolidone
[c]NR, no recoverable product

Runs 1-2 of Table I show that treatment of PPSDS with sodium hydroxide and p-dichlorobenzene in N-methyl-2-pyrrolidone (NMP) and water resulted in the formation of a poly(phenylene sulfide) polymer. Table I (runs 7-9) further shows that a sufficient amount of PPSDS, NaOH, and p-dichlorobenzene must all be present in order for the reaction to occur. Insufficient amounts of any of these compounds resulted in failure to recover any product.

Table I further shows that PPSDS was converted into a wide variety of poly(arylene sulfide)s by treatment with various dihaloaromatic compounds and sodium hydroxide in NMP. Runs 3-5 in Table I illustrated that this was accomplished using bis(4-chlorophenyl) sulfone, 4,4'-dichlorobenzophenone, and 4,4'-bis(p-chlorophenylsulfonyl)biphenyl, respectively.

Some properties of the products are shown in Table II.

TABLE II

| | | Polymer Properties | | | |
|---|---|---|---|---|---|
| | Mw | DSC[c] | | | |
| Run[a] | by GPC[b] | Tg, °C. | Tm, °C. | Tcc, °C. | Other |
| PPSDS[d] | 1150 | 85 | | | MF[e] ~45 g/10 min. |
| PPSS[f] | | 186 | | | IV[g] 0.11 dL/g |
| 1 | 5700 | 54 | 267 | 89 | |
| 2 | 12000 | 78 | 275 | 113 | ER[h] ~700 g/10 min. |
| 3 | | 124 | | | |

TABLE II-continued

| | | Polymer Properties | | | |
|---|---|---|---|---|---|
| | Mw | | DSC[c] | | |
| Run[a] | by GPC[b] | Tg, °C. | Tm, °C. | Tcc, °C. | Other |
| 4 | | 104 | 274 | 191 | |
| 5 | | 172 | 212 | | |
| 6 | | 204 | | | IV[g] 0.27 dL/g |

[a]Run numbers represent the same products made in corresponding runs in Table I.
[b]Gel Permeation Chromatography Data (GPC) were obtained by the method of C.J. Stacy (Molecular Weight Distribution of Poly(phenylene sulfide) by High Temperature Gel Permeation Chromatography that had been modified to enable sample detection by flame ionization. J. Appl. Polym. Sci. 32:3959-3969, 1986). Mw is weight average molecular weight in daltons.
[c]Differential Scanning Calorimetry Data. Glass transition temperature (Tg), crystallization temperature (Tc) and melting point (Tm) of the polymer were determined by rapidly quenching (with liquid $N_2$) a melted polymer sample and heating the thus formed substantially amorphous polymer at a rate of 20° C./minute in a differential scanning calorimeter.
[d]PPSDS, poly(phenylene sulfide disulfide) prepared under conditions described in U.S. Pat. No. 4,786,713.
[e]Melt flow at 315° C. measured by the method of ASTM D 1238-86, condition 315/5.0 modified to use a 5 minute preheat time.
[f]PPSS poly(phenylene sulfide sulfone) oligomers (about 13 repeating units) prepared under conditions described in U.S. Pat. No. 4,127,713.
[g]Inherent viscosity in NMP at 30° C. measured according to the method described in ASTM D 1243-79 wherein samples of dried polymer were dissolved in NMP at 30° C. at a polymer concentration of 0.5 g per deciliter (g/dL) using a No. 50 Cannon-Fenske viscometer.
[h]Extrusion rate at 315° C. measured by the method of ASTM D 1238-86, condition 315/0.345 modified to use an orifice having a length of 1.25 inches and a 5 minute preheat time.

Results in Table II show that the products were not degraded in solution at high temperature as is the PPSDS. The molecular weight of the PPSDS used for the synthesis of the poly(phenylene sulfide) polymers and copolymers was probably greater than that of the products, as evidenced by the high melt viscosity of the PPSDS (melt flow of 45 g/10 min.). However, the molecular weights of the products as determined by a solution technique, gel permeation chromatography (GPC), were much greater than that of the fragments formed upon dissolution of the PPSDS. The molecular weight of the product can be improved by refining the process.

The GPC data in Table II also show that oligomeric units from the fragmented PPSDS were being linked together. The remnants of the PPSDS had a weight average molecular weight of 1500 daltons, but the product (run 2, Table II) had a weight average molecular weight of 12,000 daltons. This increase in molecular weight over that of the remnants of fragmented PPSDS was also evidenced in that the product had a measurable extrusion rate at 315° C. of about 700 g/10 min. The material which was recovered after dissolving PPSDS in NMP had a melt viscosity at 315° C. which was so low that a measurable extrusion rate could not be obtained (see Example IV).

Differential Scanning Calorimetry analysis in Table II showed that the glass transition temperatures (Tg) of the products (runs 1-2) were lower than that of the parent PPSDS. This was probably due to the relatively low molecular weight of the products. However, the products also exhibited crystalline melting points (Tm) and thermal crystallization temperatures (Tcc), whereas the parent PPSDS did not. This crystallization behavior of the products indicated that they were more similar to PPS than was the parent PPSDS.

Although the yields of these reactions were rather poor, the data in Table II show that the glass transition temperature (Tg) of the product polymers were improved over that of the parent PPSDS in each case. The yields can be improved by refining the process.

Run 6 in Table I shows the reaction of PPSDS with sodium hydroxide and chlorine terminated poly(phenylene sulfide sulfone) (PPSS) oligomers. In the case a PPS/PPSS block copolymer formed. The yield was about 100% based on dihaloaromatic compound used, and the data in Table II show there was a considerable increase in the inherent viscosity (IV) of the product over that of the PPSS oligomers. The Tg (run 6, Table II) was 204° C. and was greater than those of the PPSS oligomers and the parent PPSDS.

EXAMPLE IV

This example illustrates that poly(phenylene sulfide) can also be synthesized by reacting fragments obtained from degradation of PPSDS in a solvent with a halo-substituted compound, NaOH and NMP.

Fragments were obtained from PPSDS by adding PPSDS (600 g) and NMP (3000 g) to a two gallon Hastelloy-C autoclave followed by heating, with stirring, under nitrogen, to 200° C. When the solution temperature reached 200° C., the mixture was immediately cooled to ambient temperature. The product was collected by filtration, washed twice with hot water (about 100° C.), and dried under vacuum at 100° C. overnight to give 341 g of tan powder (run 10, Table III). The melt viscosity of the material at 315° C. was so low that a melt flow index could not be determined. Other properties are tabulated in Table III.

The fragments thus obtained in run 10 (27.0 g), p-dichlorobenzene (7.4 g), sodium hydroxide (8.1 g), NMP (100 g), and water (0.5 g) were charged to a 300-mL stainless steel autoclave. The mixture was heated, with stirring, under nitrogen, to 235° C. for three hours and then allowed to cool to ambient temperature. A product polymer having high molecular weight was recovered on a 170 mesh screen, washed three times with hot water (about 100° C.) and then once with acetone, and dried under vacuum at 100° C. overnight to give 20.0 g of off-white powder (run 11). Properties of the product polymers are tabulated in Table III.

TABLE III

| | | Polymer Properties | | |
|---|---|---|---|---|
| | | | DSC[b] | |
| Run | Mw by GPC[a] | Tg, °C. | Tm, °C. | Tcc, °C. |
| 10 | 1500 | 91 | 230 | |
| 11 | 11000 | 89 | 278 | 123 |

[a]See footnote b, Table II.
[b]See footnote c, Table II.

In summary, treatment of PPSDS with sodium hydroxide and dihaloaromatic compounds in N-methyl-2-pyrrolidone, generated poly(arylene sulfide)s which were not degraded in organic solvents as is the parent PPSDS. GPC analyses clearly indicated that the product poly(phenylene sulfide) is higher in molecular weight than the fragments formed upon dissolution of the parent PPSDS. The dihaloaromatic compounds bis(4-chlorophenyl) sulfone, 4,4'-dichlorobenzophenone, and 4,4'-bis(p-chlorophenylsulfonyl)biphenyl as well as chlorine terminated poly(phenylene sulfide sulfone) oligomers have all also been shown to copolymerize with PPSDS under these conditions, and the products exhibited higher glass transition temperatures than that of the parent PPSDS. While not wishing to be bound by theory, it is believed that the copolymerization appeared to proceed via fragmentation of the PPSDS, as a result of cleavage of its disulfide linkages, into oligomers which then reacted with the base and the dihaloaromatic compound to recombine the oligomeric fragments into a new polymer.

The results shown in the above examples clearly demonstrate that the present invention is well adapted to carry out the objects and attain the ends and advantages mentioned as well as those inherent therein. While modification may be made by those skilled in the art, such modifications are encompassed within the spirit of the present invention as defined by the specification and the claims.

That which is claimed is:

1. A process for producing a poly(arylene sulfide) and a copolymer thereof from a poly(arylene sulfide disulfide) comprising contacting said poly(arylene sulfide disulfide) with a polyhalo-substituted cyclic compound having unsaturation between adjacent ring carbon atoms and having halogen atoms attached to said ring carbon atoms in a polar organic compound and a basic compound at an elevated temperature.

2. A process according to claim 1 wherein said polyhalo-substituted cyclic compound is selected from the group consisting of:

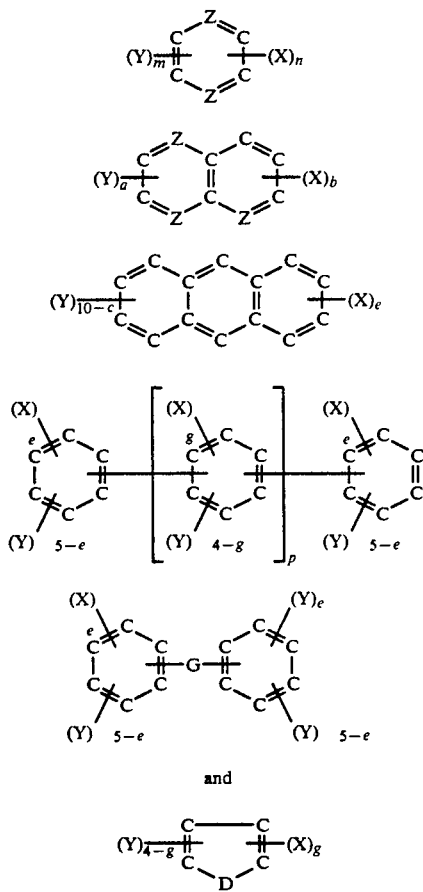

and wherein each X is a halogen selected from the group consisting of chlorine, bromine, iodine and fluorine each Y is selected from the group consisting of hydrogen, alkyl groups, —N(R)$_2$, —C(O)OR, —C(O)OM, —C(O)N(R)$_2$, —N(R)C(O)R', —OR', —SR', —SO$_3$H, and —SO$_3$M; each R is selected from the group consisting of hydrogen and alkyl, cycloalkyl, aryl, aralkyl, and alkaryl radicals containing from 1 to 12 carbon atoms; each R' is selected from the group consisting of alkyl, cycloalkyl, aryl, aralkyl and alkaryl radicals containing from 1 to 12 carbon atoms; M is an alkali metal selected from the group consisting of sodium, potassium, lithium, rubidium and cesium; each Z is selected from the group consisting of —N= and —C=; D is selected from the group consisting of —O—, —S—, and —N(-R)—; G is selected from the group consisting of —O—, —N(R)—, —C(R)(R)—, —Si(R')(R')—, —P(O)(R)—, —SO$_2$—Ar—Ar—SO$_2$—, SO$_2$(-Ar—S—Ar—SO$_2$-), —C(O)—, and —SO$_2$—; Ar is a cyclic compound containing unsaturation between adjacent ring atoms; q is an integer from about 1 to about 100; n is an integer from 2 to 6; when both Z's in Formula I are —C=, m=6−n; when one Z in Formula I is —C=, m=5−n; when both Z's in formula I are —N=, m=4−n; b is an integer from 2 to 8; when Z in Formula II is —C=, a=8−b; when Z in Formula II is —N=, a=7−b; c is an integer from 2 to 10; g is an integer of 2 to 4; e is an integer from 1 to 5; and p is an integer selected from the group consisting of 0 to 1.

3. A process according to claim 2 wherein said polyhalo-substituted cyclic compound is 1,4-dichlorobenzene.

4. A process according to claim 2 wherein said polyhalo-substituted cyclic compound is bis(4-chlorophenyl) sulfone.

5. A process according to claim 2 wherein said polyhalo-substituted cyclic compound is 4,4'-bis(p-chlorophenyl-sulfonyl)biphenyl.

6. A process according to claim 2 wherein said polyhalo-substituted cyclic compound is a chlorine-terminated poly(phenylene sulfide sulfone) oligomer.

7. A process according to claim 1 comprising contacting in the presence of an alkali metal carboxylate.

8. A process according to claim 1 wherein said process further comprises an organic amide as a reactant.

9. A process according to claim 1 comprising contacting in the presence of water.

10. A process according to claim 1 wherein said polar organic compound is selected from the group consisting of amides, lactams, sultones, and mixtures thereof.

11. A process according to claim 10 wherein said polar organic compound is N-methyl-2-pyrrolidone.

12. A process according to claim 1 wherein said basic compound is selected from the group consisting of organic base and inorganic base.

13. A process according to claim 12 wherein said basic compound is an inorganic base.

14. A process according to claim 13 wherein said basic compound is sodium hydroxide.

15. A process according to claim 1 comprising contacting at a temperature in the range of from about 125° C. to about 450° C.

16. A process according to claim 15 comprising contacting at a temperature in the range of from 180° C. to 300° C.

17. A process according to claim 1 comprising contacting under a pressure in the range of from about 0.1 atmosphere to about 25 atmospheres.

18. A process according to claim 17 wherein said pressure is in the range of from 0.9 atmosphere to 10 atmosphere.

19. A process according to claim 1 wherein said poly(arylene sulfide disulfide) is poly(phenylene sulfide disulfide).

20. A process according to claim 1 wherein said poly(arylene sulfide) is poly(phenylene sulfide).

21. A process according to claim 1 wherein the weight ratio of said polyhalo-substituted cyclic compound to said poly(arylene sulfide disulfide) is in the range of from about 0.001:1 to about 500:1.

22. A process according to claim 21 wherein said weight ratio is in the range of from 0.1:1 to 20:1.

23. A process according to claim 1 wherein the weight ratio of said polar organic compound to said poly(arylene sulfide disulfide) is in the range of from about 1:1 to about 200:1.

24. A process according to claim 23 wherein said weight ratio is in the range of from 3:1 to 50:1.

25. A process according to claim 1 wherein the weight ratio of said basic compound to said poly(arylene sulfide disulfide) is in the range of from about 0.1:1 to about 50:1.

26. A process according to claim 25 wherein said weight ratio is in the range of from 0.2:1 to 0.5:1.

27. A process according to claim 1 wherein:

the weight ratio of said polyhalo-substituted cyclic compound to said poly(arylene sulfide disulfide) is in the range of from about 0.01:1 to about 50:1;

said polar organic compound is selected from the group consisting of amides, lactams, sulfones, and mixtures thereof; and the weight ratio of said polar organic compound to said poly(arylene sulfide disulfide) is in the range of from about 1:1 to about 200:1;

said basic compound is selected from the group consisting of organic base and inorganic base; and the weight ratio of said basic compound to said poly(arylene sulfide disulfide) is in the range of from about 0.01:1 to about 50:1; and said process comprises contacting at a temperature in the range of from about 125° C. to about 450° C., under a pressure in the range of from about 0.1 atmosphere to about 25 atmospheres, and for about 20 minutes to about 20 hours.

28. A process according to claim 27 wherein:

said poly(arylene sulfide) is poly(phenylene sulfide);

said poly(arylene sulfide disulfide) is poly(phenylene sulfide disulfide);

said polyhalo-substituted cyclic compound is 1,4-dichlorobenzene and the weight ratio of said 1,4-dichlorobenzene to said poly(phenylene sulfide disulfide) in the range of from 0.3:1 to 12:1;

said polar organic compound is N-methyl-2-pyrrolidone and the weight ratio of said N-methyl-2-pyrrolidone to said poly(phenylene sulfide disulfide) is in the range of from 3:1 to 50:1;

said basic compound is sodium hydroxide and the weight ratio of said sodium hydroxide to said poly(phenylene sulfide disulfide) in the range of from 0.2:1 to 0.5:1; and said process comprises contacting at a temperature from 180° C. to 300° C., under a pressure of from 0.9 atmosphere to 10 atmospheres, and for 1 hour to 5 hours.

29. A process for converting poly(phenylene sulfide disulfide) to poly(phenylene sulfide) comprising contacting said poly(phenylene sulfide disulfide) with 1,4-dichlorobenzene in N-methyl-2-pyrrolidone and sodium hydroxide at 180° C. to 300° C., under 0.9 atmosphere to 10 atmosphere, and for 1 hour to 5 hours; wherein the weight ratio of said 1,4-dichlorobenzene to said poly(phenylene sulfide disulfide) is in the range of from 0.3:1 to 12:1; the weight ratio of said N-methyl-2-pyrrolidone to said poly(phenylene sulfide disulfide) is in the range of from 1:1 to 50:1; the weight ratio of said sodium hydroxide to said poly(phenylene sulfide disulfide) is in the range of from 0.2:1 to 0.5:1.

30. A process for producing a poly(arylene sulfide) and a copolymer thereof from a poly(arylene sulfide disulfide) comprising:

(1) substantially dissolving said poly(arylene sulfide disulfide) in a polar organic compound at an elevated temperature to form fragments; and (2) contacting said fragments with a polyhalo-substituted cyclic compound having unsaturation between adjacent ring carbon atoms and having at least one halogen atom attached to said ring carbon atoms in a polar organic compound and a basic compound at an elevated temperature.

31. A process according to claim 30, before step (2), further comprising recovering said fragments formed in step (1) of claim 30.

* * * * *

UNITED STATES PATENT AND TRADEMARK OFFICE
CERTIFICATE OF CORRECTION

PATENT NO. : 5,256,742
DATED : 10/26/93
INVENTOR(S) : William E. Sattich et al

It is certified that error appears in the above-identified patent and that said Letters Patent is hereby corrected as shown below:

Column 2, formula II, line 44, delete "Z" and insert therefor ---C---.

Column 2, formula II, line 47, delete the first occurrence of "Z" and insert therefor ---C---.

Column 11, formula II, line 29, delete "Z" and insert therefor ---C---.

Column 11, formula II, line 32, delete the first occurrence of "Z" and insert therefor ---C---.

Column 12, line 8, delete "$SO_2(Ar-S-Ar-SO_2)$" and insert therefor --- $-SO_2(Ar-S-Ar-SO_2)_q$ ---.

Column 12, line 41, delete "sultones" and insert therefor --- sulfones---.

Signed and Sealed this

Fifth Day of April, 1994

BRUCE LEHMAN

Attest:

Attesting Officer

Commissioner of Patents and Trademarks